United States Patent Office 3,533,309
Patented Oct. 13, 1970

3,533,309
INDEXING MECHANISM FOR ASSEMBLY
FABRICATING MACHINES
Albert F. Pityo and Edward L. Pityo, both of 1384
Pompton Ave., Cedar Grove, N.J. 07009
Continuation-in-part of application Ser. No. 608,296,
Jan. 10, 1967. This application Jan. 2, 1969, Ser.
No. 788,566
Int. Cl. B23b 29/32
U.S. Cl. 74—813        10 Claims

ABSTRACT OF THE DISCLOSURE

An indexing mechanism having built-in means to compensate or adjust for thermal expansion of parts which must operate in the presence of heat in the manufacturing of certain devices. The indexing work support is in ring form carrying plural circumferentially spaced work holders enabling work units to be processed by devices mounted inside and/or externally of the ring.

---

This application is a continuation-in-part of prior copending application Ser. No. 608,296 now Pat. No. 3,479,712, filed Jan. 10, 1967, for Parts Fabrication Apparatus, Having Readily Replaceable Units and Indexable Work Holding Ring Structure.

In the manufacturing of certain assemblies with extreme accuracy, a number of separate operations must be performed on the product or work unit prior to its completion. In some instances in the prior art, the various processing steps are performed manually as the work is handed from station-to-station and this obviously is laborious, slow and expensive, a well as inefficient. Many automatic work processing devices are known which greatly reduce manual labor and result in greater accuracy and efficiency than traditional hand methods. Generally, the automatic fabrication devices are employed rather haphazardly, however, on a work bench or plural benches until the required number of operations on the work or assembly are completed.

More recently, machines have been developed which index the work units from station-to-station circumferentially on a turntable so that a different operation may be performed at each station while the indexing turntable is dwelling. One broad example of this is shown in U.S. Pat. 1,627,934 to Stein.

A common disadvantage of known and existing assembly or fabricating machines resides in their complexity and expense and the inability to change or remove individual work processing units quickly without costly changes and long periods of down time for the entire machine. Additionally, the conventional horizontal turntable will not accommodate work processing units disposed radially inwardly and outwardly of the indexable work holders mounted on the turntable and this is a further limiting factor in existing machines which is overcome by the present invention which involves a ring indexing support for plural work holders, thus enabling the use of processing devices both inside and outside of the ring on a suitable underlying table structure.

In the manufacturing of certain devices typified by magnetic reed switches which are sealed in glass envelopes, high temperatures are employed at a number of the circumferentially spaced work stations. This can result in the thermal expansion of some parts which are critical in the indexing mechanism, resulting in a serious loss of accuracy in the work, such as the gap setting of a reed switch which must be held to close tolerance. The present invention corrects this defect of the prior art by a simplified mechanical means which is also applicable to the mechanism in the above-mentioned copending application Ser. No. 608,296 now Pat. No. 3,479,712. The indexing mechanism disclosed in said copending application does not require the thermal compensating improvement of this application in situations where excessive heat is not involved in the processing of work. The objectives and advantages of the invention will be further understood during the course of the following description.

DESCRIPTION OF THE PREFERRED EMBODIMENT

Figure 1:
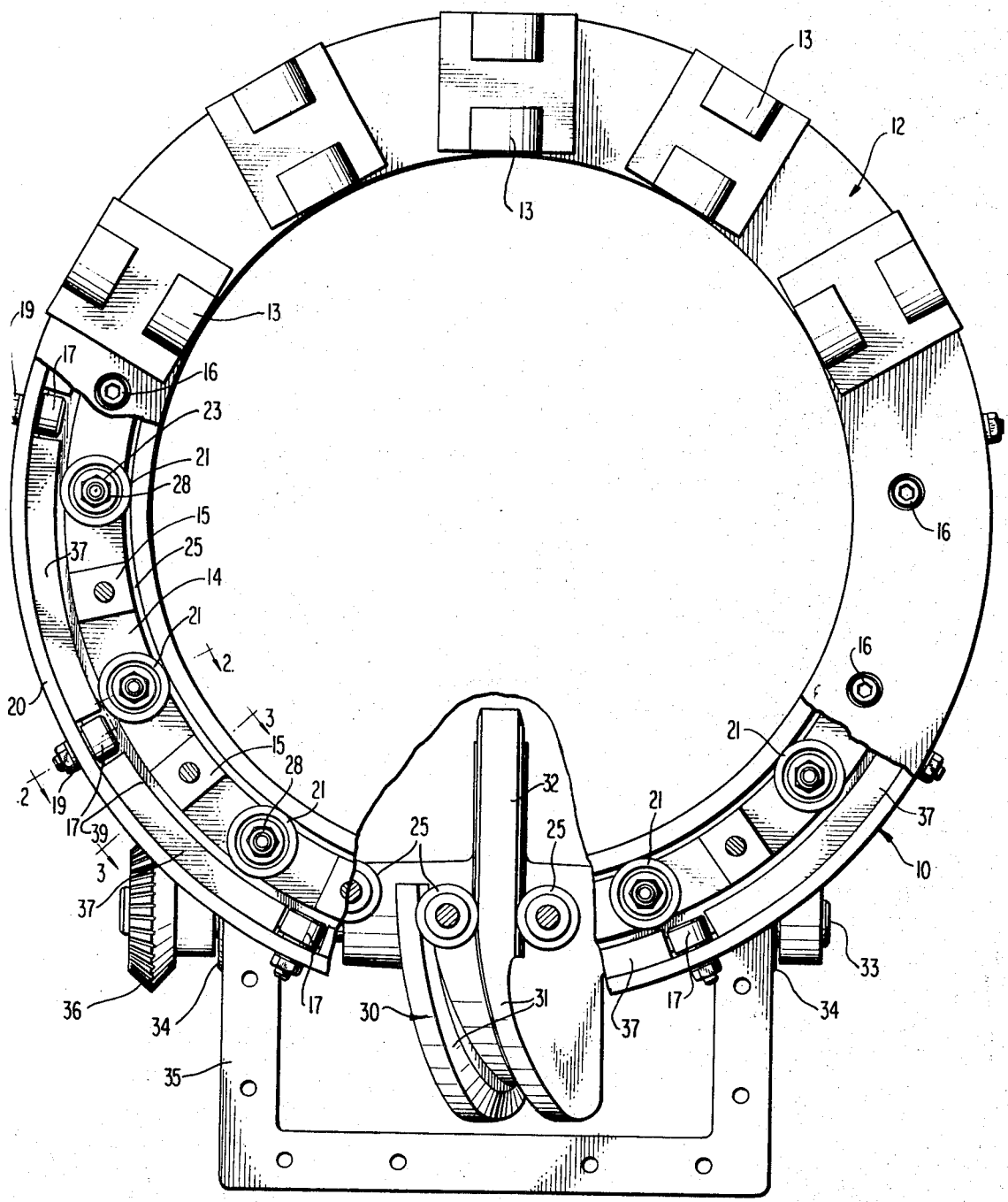
FIG. 1 is a plan view with parts broken away and parts in section of an indexing mechanism embodying the invention.

Referring to the drawings in detail wherein like numerals designate like parts, the indexing mechanism comprises an annular or ring housing 10 which is essentially U-shaped in cross section so that its top is open. The bottom wall 11 of the ring housing is adapted to be mounted fixedly on any suitable supporting table, not shown, such as the supporting table in said prior application.

Mounted directly above the ring housing 10 in close proximity thereto is the indexable ring 12 which turns relative to the fixed housing 10 and carries any suitable number of circumferentially spaced work holders 13 as shown in FIG. 1. The work holders 13 are shown somewhat diagrammatically and each work holder has a radial axis and is capable of holding a product or work element which may be processed while the ring 12 is at rest by devices arranged around the circumference of the ring either internally or externally of the ring 12 and housing 10. Such devices, usually in the form of self-contained processing heads, are mounted on the table which supports the ring housing 10 and these devices are omitted from the present drawings for simplicity and because they are not needed in the drawings for a proper understanding of the improvement. The processing heads in question are shown in the mentioned copending application.

The indexable ring 12 carries an annular guide rail 14, speced therebelow within the interior of the ring housing 10. At spaced intervals around its circumference, the rail 14 has integral upstanding heads 15 secured rigidly to the under-surface of the ring 12 by screws 16. The guide rail 14 is held against vertical displacement relative to the ring housing 10 by low friction rollers 17, arranged in vertically spaced pairs around the circumference of the housing 10 at regular intervals. The guide rollers 17 are mounted on horizontal stub axles 18 rigidly secured by screw-threaded means 19 to the outer wall 20 of the housing 10. The axes of the guide rollers 17 are radial with respect to the center of the ring housing, as shown in FIG. 1. The upper and lower surfaces of the rail 14 which engage the guide rollers 17 are very accurately finished.

Figure 2:
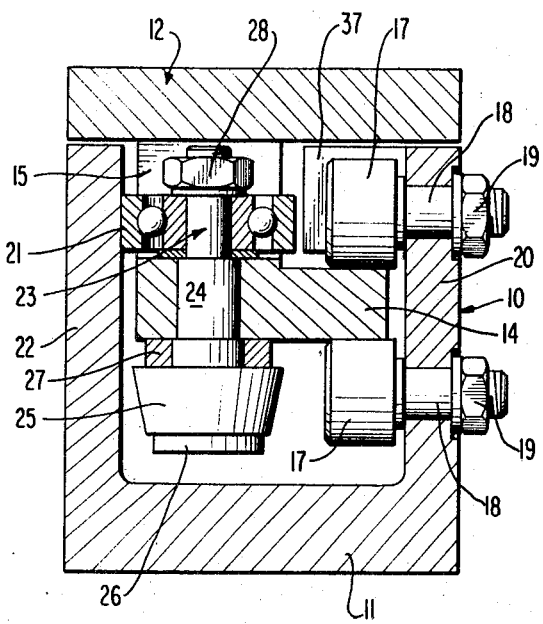
FIG. 2 is a vertical section taken on radial line 2—2 of FIG. 1.

The annular guide rail 14 and consequently the ring 12 has its radial displacement limited and controlled by a plurality of circumferentially equidistantly spaced ball bearing rollers 21 whose outer races under certain conditions contact the interior wall 22 of ring housing 10 as shown in FIG. 2. The ball bearing rollers 21 are spaced between the heads 15 around the circumference of the mechanism. The ball bearing rollers have their interior races mounted on shafts 23 having enlarged portions 24 disposed within openings formed in the rail 14. Below the rail 14 and near and above the bottom wall 11 of the ring housing the shafts 23 carry conically tapered index cam engaging rollers 25 freely journaled thereon between lower shaft heads 26 and intervening spacers 27 immediately below the rail 14. The tops of shafts 23 carry nuts 28 immediately above the ball bearing rollers and resting thereon so as to support the underlying cam driven rollers 25. The main weight of the guide rail 14 and all parts thereon is borne by the low friction rollers 17 beneath it.

Figure 3:
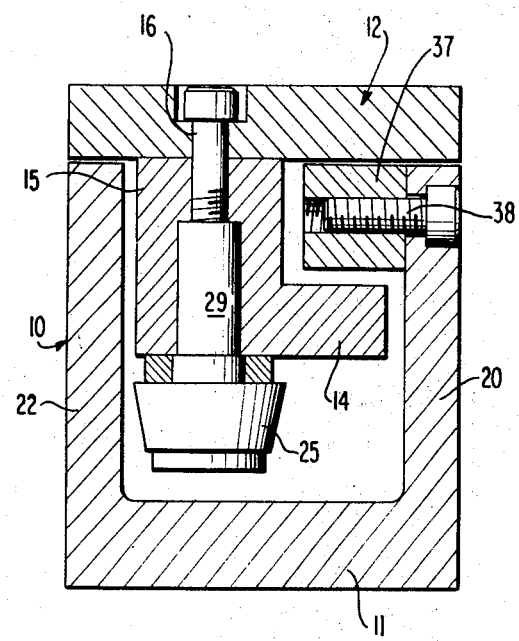
FIG. 3 is a similar section taken on line 3—3 of FIG. 1.

Additional cam driven rollers 25 are journaled on the lower ends of shafts 29 held in recesses formed in the heads 15, FIG. 3, by threaded engagement with the screws 16. All of the cam driven tapered rollers 25 are spaced apart equidistantly around the circumference of the mechanism.

As fully described in said prior application, the ring 12 is indexed by a rotary crossover cam 30 having spaced lands 31 which engage the tapered rollers 25 during rotation of the cam to advance the ring 12 a prescribed distance and to allow the ring to dwell while a straight portion or land 32 of the cam is in engagement with the adjacent rollers 25, FIG. 1. During the dwell periods of the ring 12, the various work holders 13 are positioned at fabricating heads located either inside or outside of the ring structure so that the work units in the holders 13 may have various operations performed on them. For example, in the manufacturing of magnetic reed switches, there may be as many as fourteen different operations performed at a corresponding number of work stations around the indexing ring. The cam 30 is carried by a rotary shaft 33 journaled in bearings 34 on a cam housing 35 attached to the bottom of ring housing 10. The cam shaft 33 carries a drive gear 36 driven by the main power drive means, not shown, beneath the main table as disclosed in said prior application.

Figure 4:
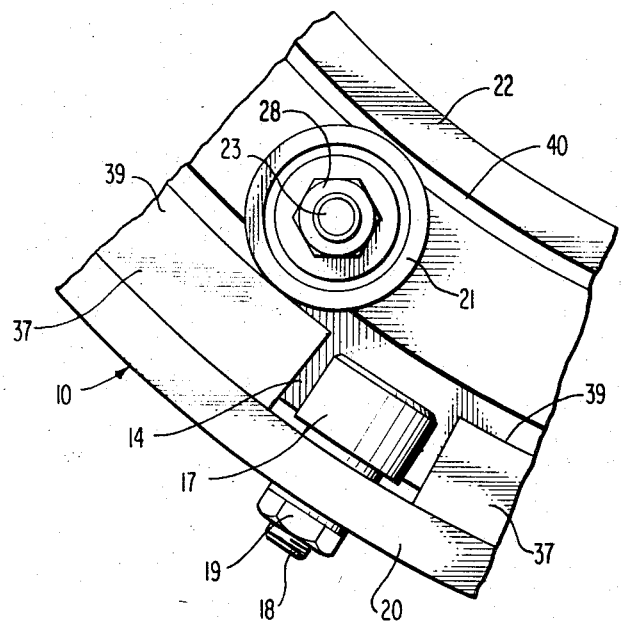
FIG. 4 is an enlarged fragmentary plan view of the mechanism with parts omitted for the purpose of illustration.

In order to accommodate the above-mentioned thermal expansion problem incident to certain manufacturing procedures where the indexing mechanism is employed, an additional outside annular guide rail or limiting means for the ball bearing rollers 21 is provided. This guide rail is preferably in the form of arcuate rail segments 37 arranged in the spaces between the upper rollers 17 and securely attached to the outer annular wall 20 of the ring housing by radial screws 38, FIG. 3. The interior faces 39, FIG. 4, of the guide rail segments are accurately formed concentrically with the annular wall 22 and engage the ball bearing rollers 21 when the ring 12 expands due to heat. At this time, FIG. 4, the rollers 21 no longer have contact with the machined face 40 of the wall 22 and have contact only with the annular rail composed of the segments 37. Conversely, when the apparatus is cool, the rollers 21 have no contact with the segments 37 and then contact the interior annular wall 22 which constitutes the other guide rail for the indexable ring 12. The number and spacing of the rollers 21 is such that a plurality of the rollers 21 will always be in contact with the outer rail composed of the segments 37 after thermal expansion and therefore the gaps between the segments 37 have no effect on the continuous smooth operation of the indexing ring.

SUMMARY OF OPERATION

The apparatus when used for manufacturing reed switches, for example, will be initially cool and the rollers 21 will be in rolling contact with the interior wall 22. This condition will prevail when the work units are placed in the holder means 13 and the various fabricating or processing heads are set up inside and/or outside of the ring 12 and around the ring on the main supporting table. The initial contact of the rollers 21 with the wall 22 furnishes an accurate initial reference position for the indexing mechanism so that all set ups and adjustments of the work and the various fabricating heads can be accurately based on a known reference condition or position of parts.

The machine is turned on and the cam 30 begins to index the ring 12 and the work holders 13 from station-to-station where the various heads will perform different operations on the work units. When heating of parts is involved, as in the manufacturing of reed switches, after a very short time interval the indexing mechanism including the ring 12 will expand within known limits which can be predetermined. When this thermal expansion takes place, the guide rollers 21 will lose contact with the wall 22 and will shift into contact with the rail segments 37 as previously described and a second stable condition of the mechanism will be obtained and will prevail throughout the continued operation of the machine, thus enabling accurate processing of the reed switches or any like devices which are being made. The mechanism is very compact and versatile, sturdy and highly accurate and the feature whereby thermal expansion of parts is accommodated by utilizing first and second stable conditions of the mechanism is a highly advantageous feature which will be appreciated readily by those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. An indexing mechanism comprising a base member attachable to a fixed support and having an annular wall providing a first guide rail, a second annular guide rail on the base member radially outwardly of the first guide rail and concentric therewith, an indexing ring member having a plurality of circumferentially spaced work holders thereon, a guide rail portion secured to the indexing ring member and disposed in proximity to the base member, guide roller elements on the base member engaging opposite sides of the guide rail portion and preventing substantially vertical displacement of the indexing ring member during turning of the ring member, second guide roller elements on the indexing ring member and disposed between said first and second annular guide rails of the base member, whereby the second guide roller elements may rollingly contact the first annular guide rail when the mechanism is in one thermally stable condition and may subsequently contact the second annular guide rail when the mechanism is in a second thermally stable condition, and driving means connected with the indexing ring member to turn the same relative to the base member in a step and dwell manner.

2. An indexing mechanism as defined in claim 1, and wherein said driving means includes a rotary indexing cam, and plural circumferentially spaced cam follower elements on the indexing ring member engaging the cam.

3. An indexing mechanism as defined in claim 1, wherein said base member is a ring member generally U-shaped in cross section, and said indexing ring member is arranged immediately above the base member and said guide rail portion is disposed within the interior of the U-shaped base member, said guide roller elements on the base member engaging top and bottom faces of said guide rail portion, said guide rail portion being dependingly secured to the indexing ring member.

4. An indexing mechanism as defined in claim 3, wherein said second guide roller elements are a plurality of circumferentially spaced guide rollers having their rotational axes substantially normal to the axes of the guide roller elements on the base member, whereby the indexing ring member is stabilized in all directions.

5. An indexing mechanism as defined in claim 4, wherein the second annular guide rail on the base member is composed of plural arcuate guide rail segments anchored to the outer annular wall of the U-shaped base member, and said guide roller elements on the base member are disposed within gap spaces between ends of said segments.

6. An indexing mechanism comprising a supporting base member, an indexing ring member including low friction guide means mounting the indexing ring member upon the supporting base member and restraining relative movement of the two members in one direction while allowing the indexing ring member to turn relative to the supporting base member, first and second radially spaced concentric annular guide rail means for the indexing ring member on the supporting base member, second low friction guide means on the indexing ring member disposed between said first and second annular guide rail means and engaging the interior guide rail means only when the mechanism is in one thermally stable condition and shifting into engagement with the exterior annular guide rail means and separating from the interior guide rail means when the mechanism is in a second thermally stable condition, and means to drive said indexing ring member in a turn and dwell mode.

7. An indexing mechanism as defined in claim 6, and wherein said second low friction guide means comprises a plurality of circumferentially spaced low friction rollers on the indexing ring member having their rotational axes parallel to the central rotational axis of the indexing ring member.

8. An indexing mechanism as defined in claim 6, and an annular rail portion secured dependingly to the indexing ring member and spaced therebelow and received within the interior of the supporting base member, the supporting base member being annular and substantially U-shaped in cross section, the first-named low friction guide means including plural circumferentially spaced pairs of guide rollers on one wall of the supporting base member with one roller of each pair contacting the top of said rail portion and the other roller of each pair contacting the bottom of said rail portion.

9. An indexing mechanism as defined in claim 6, and wherein said means to drive the indexing ring member includes a rotary indexing cam, and circumferentially spaced cam followers on the indexing ring member engaging said cam.

10. An indexing mechanism as defined in claim 9, and wherein said cam followers are rollers, shafts on the indexing ring member carrying said rollers and also carrying said second low friction guide means.

References Cited

UNITED STATES PATENTS

| | | | |
|---|---|---|---|
| 3,153,355 | 10/1964 | Opperthauser et al. | 74—822 XR |
| 3,324,742 | 6/1967 | Kavanaugh | 74—813 |

FRED C. MATTERN, JR., Primary Examiner

F. D. SHOEMAKER, Assistant Examiner

U.S. Cl. X.R.

74—426, 567, 817, 827